(12) United States Patent
Sheen et al.

(10) Patent No.: US 6,466,449 B1
(45) Date of Patent: Oct. 15, 2002

(54) MULTI PART DISK CAGE APPARATUS

(75) Inventors: Lewis B. Sheen, Shirley, MA (US); Robert S. Antonuccio, Burlington, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/920,509

(22) Filed: Aug. 1, 2001

(51) Int. Cl.⁷ .......................... H05K 5/00; H05K 5/06; H05K 5/04
(52) U.S. Cl. .................. 361/752; 361/797; 361/816; 361/714; 211/26; 211/41.17; 206/707; 206/708
(58) Field of Search ................. 361/752, 729, 361/714, 816, 797, 800, 796, 756; 211/26, 41.17; 312/223.1, 223.2, 257.1, 265.5, 265.2; 206/707, 708

(56) References Cited

U.S. PATENT DOCUMENTS

| | | | |
|---|---|---|---|
| 3,733,523 A | * 5/1973 | Reynolds et al. | 211/41.17 |
| 4,232,356 A | * 11/1980 | Saunders et al. | 174/DIG. 9 |
| 4,356,531 A | * 10/1982 | Marino et al. | 312/265.5 |
| 5,853,512 A | * 12/1998 | McKinney | 156/78 |
| 6,317,329 B1 | * 11/2001 | Dowdy et al. | 312/223.3 |

* cited by examiner

*Primary Examiner*—David Martin
*Assistant Examiner*—Hung Bui
(74) *Attorney, Agent, or Firm*—Kudirka Jobse, LLP

(57) ABSTRACT

A disk cage assembly into which multiple disk drives may be removably inserted is formed from two separate frames which are identical in shape and design and include complimentary mating features enabling the frames to be joined to form a symmetrical four-sided structure. The frames are symmetrical about a midpoint and are easily manufactured since all interior surfaces are accessible during the manufacturing process. A surface of the frames defines a plurality of channels into which modular disk drives may be inserted. In one embodiment, the frames are designed to accommodate a mid-panel which is securable within the structure and can be used to increase the number modular disk drives which can be disposed therein. The assembly may be formed from a number of different materials, including structural foam which can be used to help absorb vibrations among the disk drives within the assembly.

23 Claims, 5 Drawing Sheets

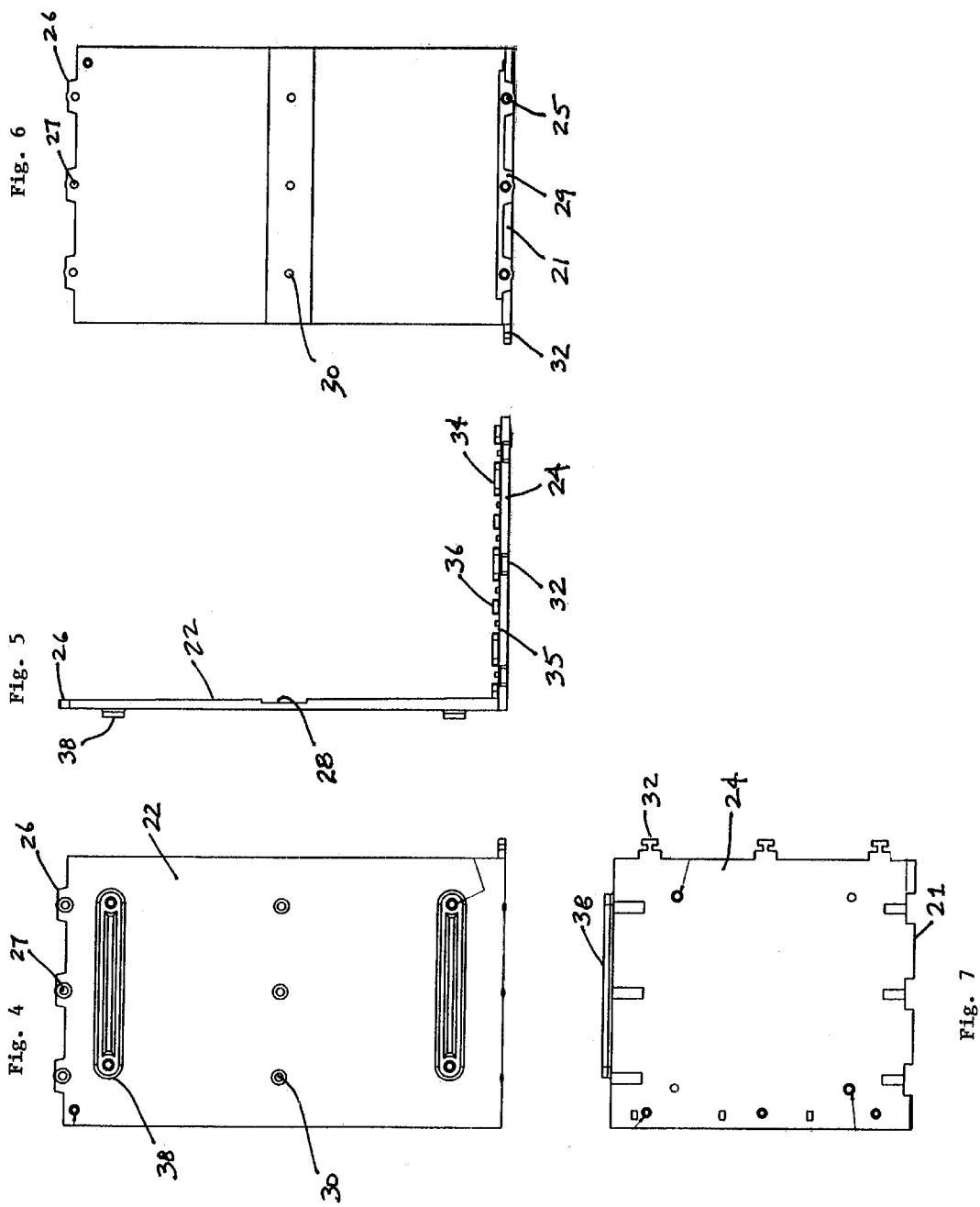

MULTI PART DISK CAGE APPARATUS

FIELD OF THE INVENTION

The invention relates to media drives, and, more specifically, to a cage assembly for accommodating multiple drives in a computer system.

BACKGROUND OF THE INVENTION

Computer systems typically include one or more drives for storage media such as magnetic disks, CD ROM disks or DVD disks. Such drives may accommodate either fixed or removable media. In more sophisticated computer systems, such as server platforms, multiple fixed disk arrays may be utilized to enhance the storage capacity and increase server performance.

Most computer manufacturers utilize a modular disk drive design which can be inserted and removed from the computer system. This configuration allows easier system assembly and maintenance, including removal and/or replacement of disk drives. Accordingly, disk drives are typically stacked in the physical housing of the computer system and are usually coupled to the same power and control signal sources. More specifically, computer manufacturers typically locate multiple disk drives within a box or frame-like assembly. Such assemblies require the interior surfaces thereof to have certain features to facilitate insertion and removal of disk drive modules. Unfortunately, a relatively complicated tooling process is required to manufacture the necessary features on the interior surfaces of the structure, often requiring a four-way collapsible core tool. Such manufacturing complexities increase the costs of the components, and, therefore, the costs of the overall computer system. Accordingly, a need exists for an assembly to house multiple disk drives which can be manufactured inexpensively and with simple tools.

Further, since many high-end computer systems are custom designed, with the number of disk drives being selectable by the purchaser, the housing or frame into which the disk drives are inserted typically accommodates multiple drives. With more sophisticated machines, large numbers of disk drives may be required, i.e., a dozen or more disk drives. Accordingly, a need exists for not only an assembly which can house multiple disk drives but for an assembly which can be configured with other similar assemblies to accommodate multiples of the maximum number of drives available in each specific assembly.

Additionally, current disk drives operate at extremely high RPM disk and are often stacked or adjacent within an assembly. Unfortunately, the motion of the read/write head as it traverses the surface of a spinning disk can cause "rotational vibration error" in adjacent drives. Such errors, induced by rotational vibration of a disk drive, actually diminish the tracking accuracy, and, therefore the data throughput, of the read/write head in adjacent drives. Accordingly, a further need exists for a disk drive assembly in which multiple disk drives may reside and which reduces the effects of unwanted vibrations among adjacent disk drives.

SUMMARY OF THE INVENTION

The present invention provides a cage-like assembly into which multiple disk drives may be easily inserted and removed. The assembly comprises a symmetrical four-sided box formed from two separate frames which are identical in shape and design and include complimentary mating features to enable joining to form the four-sided cage assembly. The frames can be manufactured, no matter how complex the surface features, since all surfaces are accessible and exposed during the manufacturing process. In one embodiment, the frames and/or the mid-panel may be formed of a structural foam or similar material to help prevent unwanted vibrations among adjacent drives during read/write operations. In another embodiment, the frames include surface features to allow positioning of adjacent assembly so that multiple disk drive banks may be accomplished using relatively few customized parts. In an another embodiment, the frames are L-shaped with one leg longer that another and are designed to receive a panel. The panel, as well as selected ones of the interior surfaces of the frames, include features which allow for removal and/or installation of modular disk drives.

According to a first aspect of the invention, an apparatus for accommodating multiple storage medium drives in a computer system comprises a housing formed from a pair of frames, each frame having identical features and dimensions and being symmetrical about a midpoint, each frame further comprising first and second legs joined together; the first leg having a mechanism for enabling attachment of the first leg to the second leg of another frame, the second leg having a mechanism for enabling attachment of the second let to the first leg of another frame, a surface on one of the first and second legs defining at least one channel into which a storage medium drive may be received. In one embodiment, a plurality of channels are defined in the surface of the frame for receiving a plurality of storage medium drives. In another embodiment, a mid-panel is securable within the housing and includes a surface defining a plurality of channels into which a plurality of storage medium drive may be received. In another embodiment, the frames may be made from structural foam to enhance absorption of vibrations within the housing caused by the storage medium drives.

According to a second aspect of the invention, a method for manufacturing an assembly for accommodating at least one storage medium drive in a computer system comprising (a) providing a pair of frames, each frame having identical features and dimensions and being symmetrical about a midpoint, each frame further comprising first and second legs joined together; the first leg having a mechanism for enabling attachment of the first leg to the second leg of another frame, the second leg having a mechanism for enabling attachment of the second let to the first leg of another frame, a surface on one of the first and second legs defining at least one channel into which a storage medium drive may be received; (b) attaching the second leg of one frame to the first leg of another frame; and (c) attaching the first leg of said one frame to the second leg of said other frame so as to form a four-sided assembly into which at least one storage medium drive may be received. In one embodiment, the method further comprises removably disposing at least one storage medium drive into the channels defined in the surfaces of the frames. In another embodiment, the method further comprises (d) providing a mid-panel securable within the assembly, the mid-panel having a surface defining at least one channel into which the storage medium drive may be received and (e) securing the mid-panel within the assembly. In yet another embodiment, the method comprises removably disposing at least one storage medium drive into the channels defined in the surfaces of the frames and the mid-panel.

According to a third aspect of the invention, an article of manufacture comprises a frame used for forming a housing for at least one storage medium drive, the frame being symmetrical about a midpoint and comprising: first and second legs; means for enabling attachment of the first leg to the second leg of another frame, means for enabling attachment of the second leg to the first leg of said another frame, and a surface on one of the first and second legs defining at least one channel into which a storage medium drive may be received. In one embodiment the frame has a unitary design and is formed of structural foam.

According to a fourth aspect of the invention, an apparatus for accommodating at least one storage medium drive in a computer system comprises: a housing formed from a pair of frames, each frame having identical features and dimensions and being symmetrical about a midpoint, each frame further comprising: first and second legs; means for enabling attachment of the first leg to the second leg of the other frame of the pair, means for enabling attachment of the second leg to the first leg of the other frame of the pair, and. means for receiving at least one storage medium drive. In one embodiment the means for receiving at least one storage medium drive comprises one or more channels defined in the surface of one of the first and second legs and into which one or more storage medium drives may be received.

BRIEF DESCRIPTION OF THE DRAWINGS

The above and further advantages of the invention may be better understood by referring to the following description in conjunction with the accompanying drawings in which:

FIG. 4 is an bottom view of the L-shaped frame of FIG. 3;

FIG. 5 is a side view of the L-shaped frame of FIG. 3;

FIG. 6 is a top view of the L-shaped frame of FIG. 3;

FIG. 7 is a side view of the L-shaped frame of FIG. 3;

DETAILED DESCRIPTION

Figure 2:
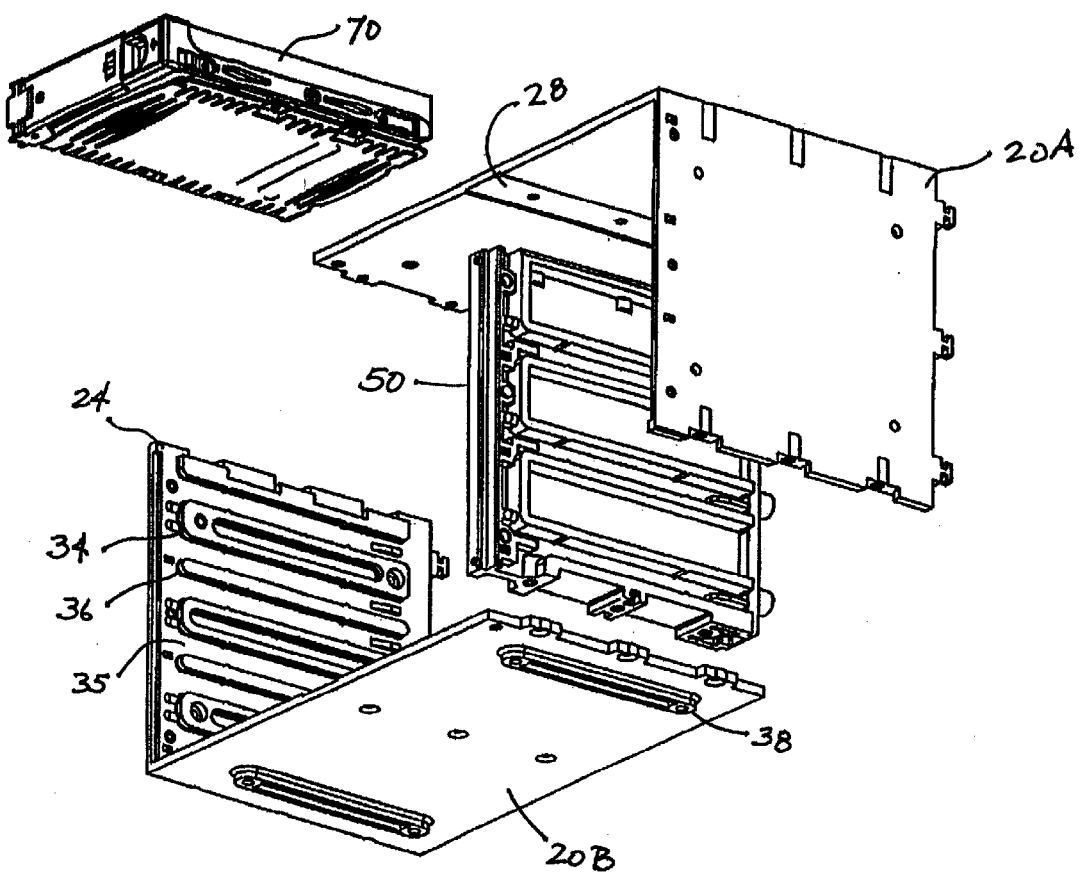
FIG. 2 is an exploded perspective view of the assembly of FIG. 1 illustrating the relationship of the frames, mid-panel and disk drive.
Figure 1:
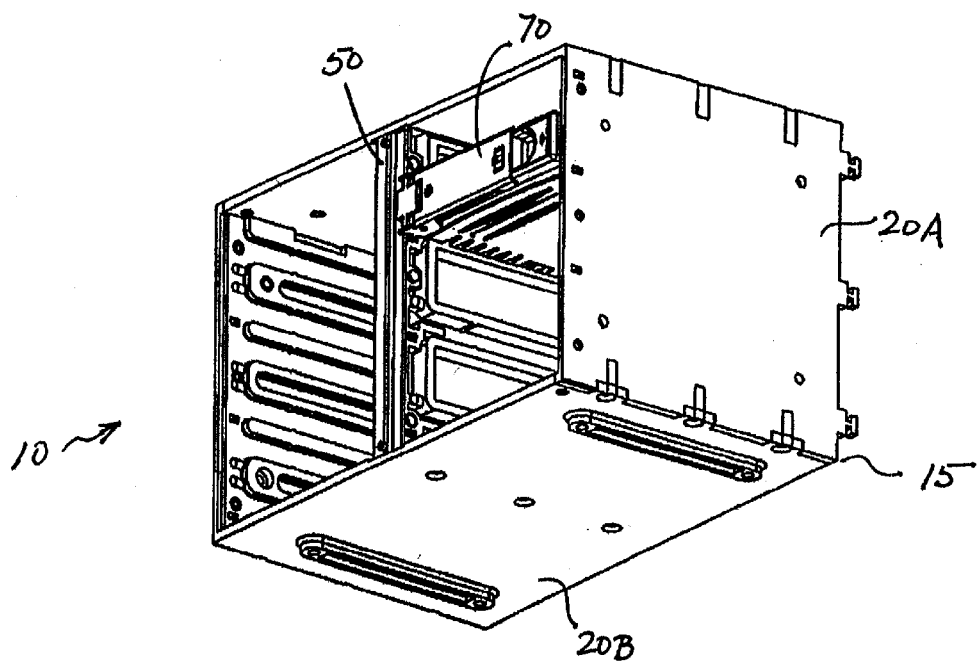
FIG. 1 is a perspective view of a multi-part disk cage assembly in accordance with the present invention.
Figure 3:
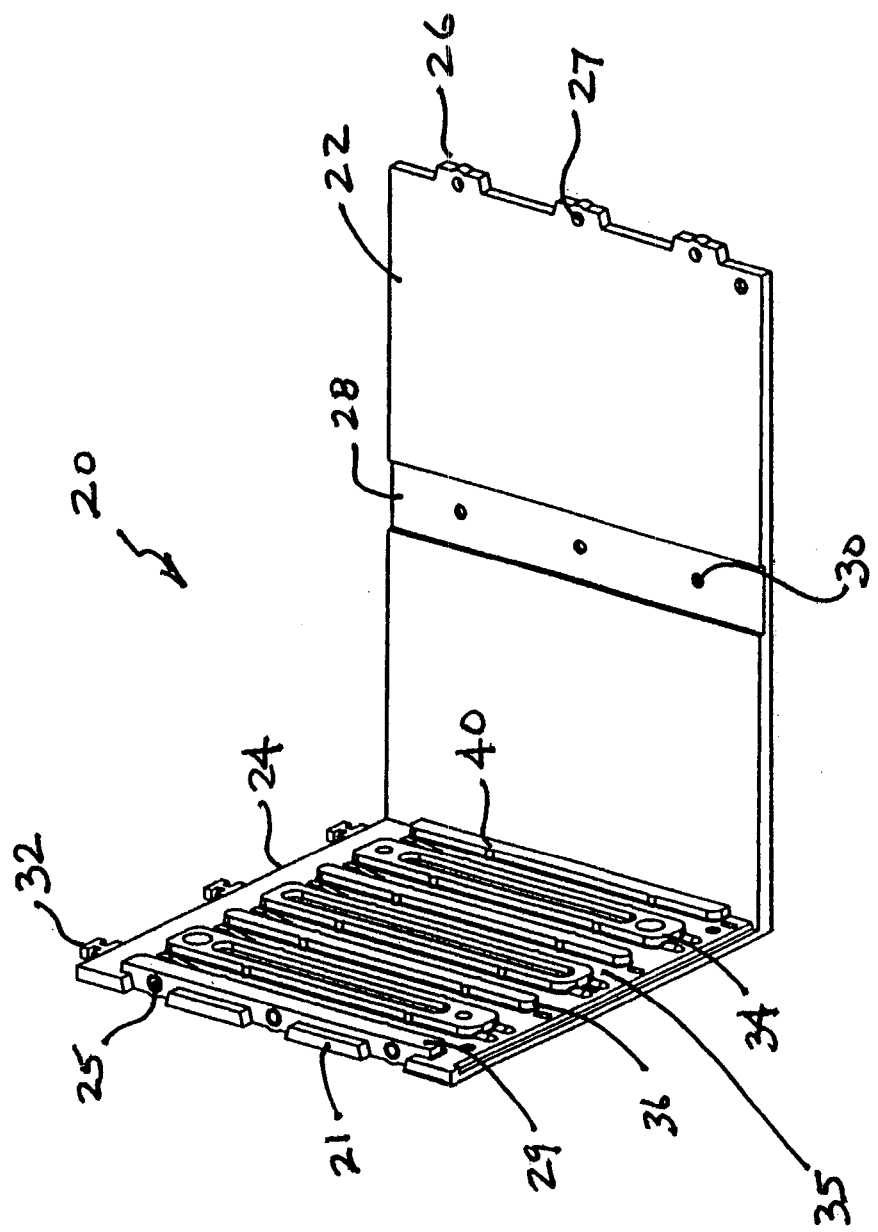
FIG. 3 is a perspective view of an L-shaped frame used in the cage assembly of FIG. 1.
Figure 9:
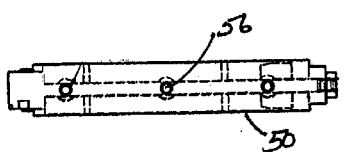
FIG. 9 is a top view of the mid-panel of FIG. 8.
Figure 8:
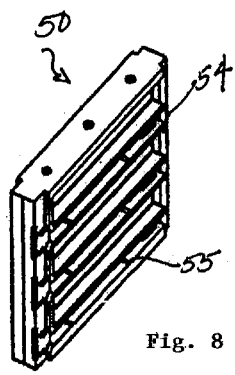
FIG. 8 is a perspective view of a mid-panel for use inside the disk cage assembly in accordance with the present invention.
Figure 10:
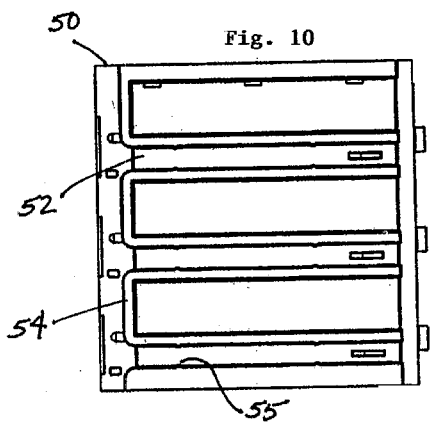
FIG. 10 is a front view of the mid-panel of FIG. 8.
Figure 11:
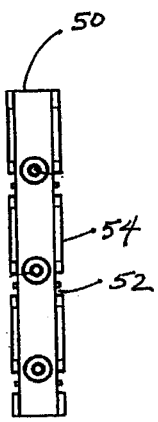
FIG. 11 is a side view of the mid-panel of FIG. 8.
Figure 12:
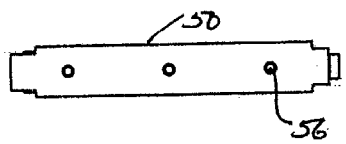
FIG. 12 is a bottom view of the mid-panel of FIG. 8.

Referring to FIGS. 1–2, a disk cage assembly is shown in accordance with an illustrative embodiment of the invention. Assembly 10 comprises a housing 15 and a mid-panel 50 secured within the housing. A modular disk drive 70 is shown, for illustrative purposes only, inserted within assembly 10. Disk drive assembly 70 is not part of the actual invention.

As illustrated in FIG. 2, housing 15 is formed by the joining of two identical, frames 20A and 20B, either of which may also be referred to hereafter simply as "frame 20." Each frame 20 has substantially identical, shape, features, dimensions and is symmetrical about a midpoint. When joined, frames 20A and 20B form the housing 15 into which mid-panel 50 is secured. In the illustrative embodiment, up to six modular disk drives 70 may be inserted into assembly 10, with three on each side of panel 50.

Referring to FIGS. 3–7, an L-shaped frame 20 is illustrated having a long leg 22 and a short leg 24. In the illustrative embodiment, frame 20 has a unitary design which may be tooled from a single piece of material. A channel 28 extends along the a surface of long leg 22. One or more threaded apertures 30 extend through long leg 22 from channel 28 to a surface of long leg 22 on the opposite side. A plurality of projections 26, each containing a threaded aperture 27, extend from the free end of long leg 22 to facilitate attachment of long leg 22 to the short leg 24 of a second frame 20. As shown in FIGS. 1–2 and 4, the bottom surface of long leg 22 of frame 20 includes a pair of mounting feet 38 having one or more threaded apertures extending through to facilitate mounting of assembly 10 to either a cabinet of a computer system or to other similarly designed assemblies 10.

Short leg 24 of frame 20 includes a lip 29 at the free end thereof into which a plurality of threaded apertures 25 are formed. A plurality of projections 21 extend outward from lip 29. In the illustrative embodiment, projections 21 have a shape which interlocks in a complimentary mating manner with projections 26 of long leg 22 of a second frame 20. When threaded apertures 25 of short leg 24 of a first frame 20 and threaded aperture 27 of long leg 22 of a second frame 20 are aligned and secured with a screw or other fastener, the pair of frames 20 together form housing 15 of assembly 10. A plurality of board mounts 32 extend from a side edge of short leg 24 to facilitate mounting of assembly 10 to a circuit board or backplane within the computer system.

The interior surface of short leg 24 of frame 20 includes a plurality of relief features 34 and 36 arranged in an alternating pattern to form a plurality of channels 35 into which modular disks drives 70 may be removably disposed. In the illustrative embodiment, a plurality of three complete channels 35 are defined within the interior surface of short leg 24. As illustrated, selected edges of features 34 and 36 include one or more pinches 40, e.g. opposed bumps, which help maintain the modular disk drive 70 in place upon insertion. The features 34 and 36 and the channels 35 defined therein on short short leg 24 of frame 20, in conjunction with features of mid-panel 50 collectively define, in the illustrative embodiment, three bays, into which modular disk drives 70 may be received and removably disposed. It will be obvious to those reasonably skilled in the art that the size, shape and number of features 34 and 36, and therefore the number of intermediate channels 35, as well as the pinches or other features contained thereon, may vary according to the actual size, shape and profile of the modular disk drives 70 which are to be inserted within the drive bays of assembly 10. For example, features 34 and 36 may be replaced with pairs of brackets or other structures on the surface of leg 24 which do not define channels as in the illustrative embodiment, but define structures into which a modular disk drive may be inserted.

In the illustrative embodiment, frames 20 may be manufactured, typically through an injection molding process, from any number of rigid materials including Noryl™, commercially available from General Electric, Plastics Division, Pittsfield, Mass. Other suitable materials from which frames 20 may be manufactured include plexiglass, polycarbonate ABS blends, structural foam, aluminum or cast metal. As explained hereinafter, structural foam has a smooth exterior surface but a randomly cavitated internal core which aids in absorbing vibrations and therefore helps dampen unwanted vibrations among disk drives 70. Alternatively, frames 20 may be machined from a single piece of rigid material.

Referring to FIGS. 8–12, a mid-panel 50 in accordance with the present invention is illustrated. Mid-panel 50, in the illustrative embodiment, may also have a unitary design and be injection molded from material similar to that from which frames 20 are made. Alternatively, mid-panel 50 may be machined from a single piece of rigid material. Other suitable materials from which mid-panel 50 may be made include natural or synthetic resins.

The top and bottom of mid-panel 50 include apertures 56 which, when aligned with threaded apertures 30 facilitate securing mid-panel 50 within the formed housing 15. The opposing exterior sides of panel 50 include a plurality of features 54, as illustrated, which collectively define a plurality of channels 52 which in conjunction with channels 35 of frame 20 define a plurality of bays into which disk drives 70 may be inserted. Like the features 34 and 36 of frame 20, features 54 include along selected edges thereof pinches 55 which help maintain the modular disk drive 70 in place upon insertion. The features 54 may be similar or different to features 34 and 36 on short leg 24 of frame 20, depending on the exterior configuration and shape of the modular disk drive 70, however, the channels 52 should be substantially aligned with the channels 35 of frame 20 so the at the modular disk drive 70 will be aligned upon insertion into assembly 10.

Figure 13:
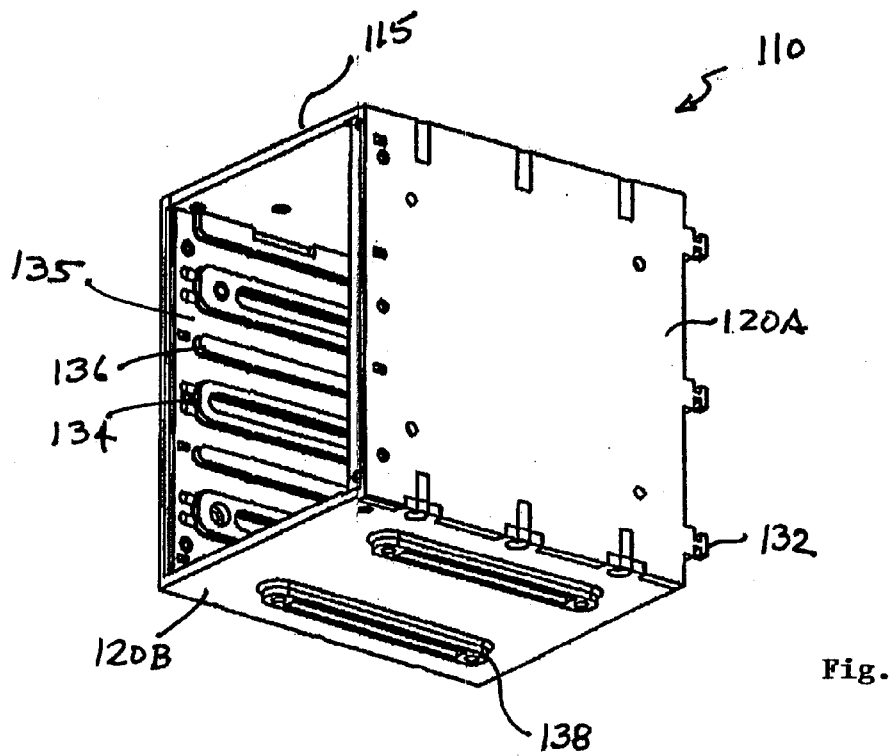
FIG. 13 is a perspective view of a multi-part disk cage assembly, without a mid-panel, in accordance with an alternative embodiment of the present invention.
Figure 14:
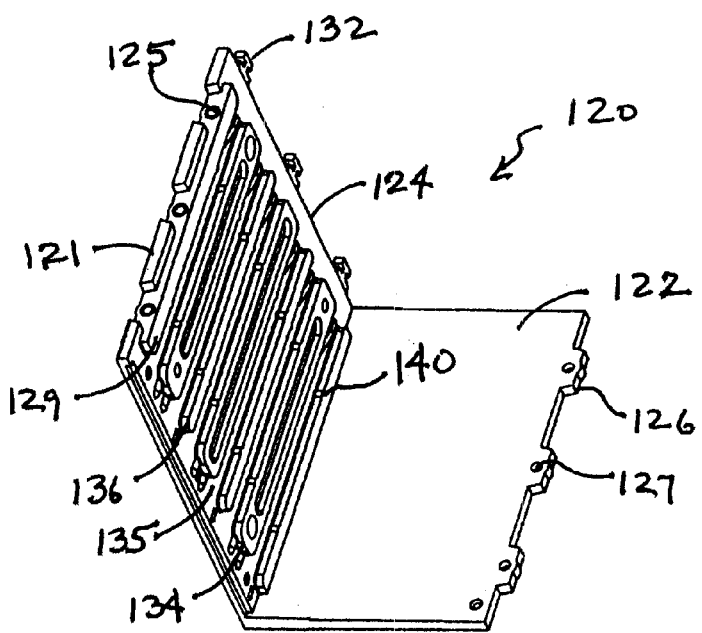
FIG. 14 is a perspective view of an L-shaped frame used in the cage assembly of FIG. 13.

Referring to FIGS. 13–14, a disk cage assembly 110 is shown in accordance with an alternative illustrative embodiment of the invention. Assembly 110 comprises a housing 115 formed by the joining of two identical, frames 120A and 120B either of which may also be referred to hereafter simply as "frame 120." Each frame 120 has substantially identical, shape, features, dimensions and is symmetrical about a midpoint. When joined, frames 120A and 120B form the housing 115 into which a modular disk drive 70. In the illustrative embodiment, up to three modular disk drives 70 may be inserted into assembly 110. In the alternate embodiment of FIGS. 13–14, the mid-panel 50 has been eliminated and the dimensions of frame 120 adapted accordingly so that modular disk drive 70 may be inserted into channels 135 between long legs 124 of two joined frames 120.

Referring to FIG. 14, a frame 120 is illustrated having a short leg 122 and a long leg 124. In the illustrative embodiment, frame 120 has a unitary design which may be tooled from a single piece of material, similar to frame 20 as described above. A plurality of projections 126, each containing a threaded aperture 127, extend from the free end of short leg 122 to facilitate attachment of short leg 122 to the long leg 124 of a second frame 120. As shown in FIGS. 13–14, the bottom surface of short leg 122 of frame 120 includes a pair of mounting feet 138 having apertures extending therethrough to facilitate mounting of assembly 110 to either a cabinet of a computer system or to other similarly designed assemblies 110.

Long leg 124 of frame 120 includes a lip 129 at the free end thereof into which a plurality of threaded apertures 125 are formed. A plurality of projections 121 extend outward from lip 129. In the illustrative embodiment, projections 121 have a shape which interlocks in a complimentary mating manner with projections 126 of the short leg 122 of a second frame 120. When threaded apertures 125 of long leg 124 of a first frame 120 and threaded aperture 127 of long leg 122 of a second frame 120 are aligned and secured with a screw or other threaded fastener, the pair of frames 120 together form assembly 110. A plurality of board mounts 132 extend from a side edge of long leg 124 to facilitate mounting of assembly 110 to a circuit board or backplane within the computer system.

The interior surface of long leg 124 of frame 120 includes a plurality of relief features 134 and 136 arranged in an alternating pattern to form a plurality of channels 135 into which modular disks drives 70 may be disposed. In the illustrative embodiment, a plurality of three channels 135 are defined within the interior surface of long leg 124. As illustrated, selected edges of features 134 and 136 include one or more pinches 140, e.g. opposed bumps, which help maintain the modular disk drive 70 in place upon insertion. As illustrated, selected edges of features 134 and 136 include one or more pinches 140, e.g. opposed bumps, which help maintain the modular disk drive 70 in place upon insertion. The features 134 and 136 and the channels 135 defined therein on long leg 124 of frame 120, in conjunction with the same features on the long leg of another frame 120 collectively define, in the illustrative embodiment, three bays, into which modular disk drives 70 may be received and removably disposed. It will be obvious to those reasonably skilled in the art that the size, shape and number of features 134 and 136, and therefore the number of intermediate channels 135, as well as the pinches or other features contained thereon, may vary according to the actual size, shape and profile of the modular disk drives 70 which are to be inserted within the drive bags of assembly 110. In the illustrative embodiment, frames 120 may be manufactured from the same materials and by similar processes as frames 20, as previously described.

It will be obvious to those reasonably skilled in the art that the actual design and shapes of those features along the free edges of legs 122 and 124 of frame 120, as well legs 22 and 24 of frame 20 may be modified, as well as the techniques for securing the frames to form a housing. For example, in addition to screws or other threaded fasteners, pins, brackets, dowels, adhesive, thermobonding or other techniques may be utilized to secure the two symmetrical frames together to form assembly as essentially described herein. Accordingly, the illustrative embodiment disclosed herein should not be considered limiting.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not by the particular features which have been shown and described, but shall be construed also to cover any obvious modifications and equivalents thereof.

What is claimed is:

1. An apparatus for accommodating at least one storage medium drive in a computer system comprising:
   a housing formed from a pair of frames, each frame having identical features and dimensions and being symmetrical about a midpoint, each frame further comprising:
   first and second legs;

the first leg having a mechanism for enabling attachment of the first leg to the second leg of the other frame of the pair, the second leg having a mechanism for enabling attachment of the second leg to the first leg of the other frame of the pair, and a surface on one of the first and second legs defining at least one channel into which a storage medium drive may be received.

2. The apparatus of claim 1 wherein a plurality of channels are defined in the surface of each frame for receiving a plurality of storage medium drives.

3. The apparatus of claim 1 further including a mid-panel securable within the housing, the mid-panel having a surface defining at least one channel into which a storage medium drive may be received.

4. The apparatus of claim 3 wherein a plurality of channels are defined in the surface of the mid-panel and into which a plurality storage medium drives may be received.

5. The apparatus of claim 4 wherein a plurality of channels are defined in each of opposite surfaces of the mid-panel and into which a plurality storage medium drives may be received.

6. The apparatus of claim 1 in combination with a storage medium drive disposed in the at least one channel.

7. The apparatus of claim 1 wherein the frames are formed from a structural foam material.

8. The apparatus of claim 1 wherein the mechanisms for enabling attachment of the first and second legs together include threaded apertures for receiving a threaded fastener.

9. The apparatus of claim 1 further including a mechanism on a surface of the frame to enable attachment to one of another surface and a similar apparatus.

10. A method for manufacturing an assembly for accommodating at least one storage medium drive in a computer system comprising:

(a) providing a pair of frames, each frame having identical features and dimensions and being symmetrical about a midpoint, each frame further comprising:

first and second legs joined together;

the first leg having a mechanism for enabling attachment of the first leg to the second leg of another frame, the second leg having a mechanism for enabling attachment of the second let to the first leg of another frame, a surface on one of the first and second legs defining at least one channel into which a storage medium drive may be received;

(b) attaching the second leg of one frame to the first leg of another frame; and (c) attaching the first leg of said one frame to the second leg of said other frame so as to form a four-sided assembly into which at least one storage medium drive may be removably received.

11. The method of claim 10 further comprising:

(d) removably disposing at least one storage medium drive into the channels defined in the surfaces of the frames.

12. The method of claim 10 wherein each frame includes a surface defining a plurality of channels into which storage medium drives may be received and further comprising:

(d) removably disposing a plurality of storage medium drives into the channels defined by the surfaces of the frames.

13. The method of claim 10 further comprising:

(d) providing a mid-panel securable within the assembly, the mid-panel having a surface defining at least one channel into which a storage medium drive may be received; and (e) securing the mid-panel within the assembly.

14. The method of claim 13 further comprising:

(f) removably disposing at least one storage medium drive into the channels defined in the surfaces of the frames and the mid-panel.

15. The method of claim 13 wherein each of the frames and mid-panel include a surface defining a plurality of channels into which storage medium drives may be received and further comprising:

(f) removably disposing a plurality of storage medium drives into the channels defined by the surfaces of the frames and mid-panel.

16. An article of manufacture comprising:

a frame used for forming a housing for at least one storage medium drive, the frame being symmetrical about a midpoint and comprising:

first and second legs;

means for enabling attachment of the first leg to the second leg of another frame, means for enabling attachment of the second leg to the first leg of said another frame, and a surface on one of the first and second legs defining at least one channel into which a storage medium drive may be received.

17. The apparatus of claim 16 wherein a plurality of channels are defined in the surface of the frame for receiving a plurality of storage medium drives.

18. The apparatus of claim 16 wherein the frame has a unitary design.

19. The apparatus of claim 16 wherein the frame is manufactured from structural foam.

20. An apparatus for accommodating at least one storage medium drive in a computer system comprising:

a housing formed from a pair of L-shaped frames, each frame having identical features and dimensions and being symmetrical about a midpoint, each frame further comprising:

first and second legs;

means for enabling attachment of the first leg to the second leg of the other frame of the pair, means for enabling attachment of the second leg to the first leg of the other frame of the pair, and means for receiving at least one storage medium drive.

21. The apparatus of claim 1 wherein the means for receiving comprises at least one channel defined in the surface of one of the first and second legs and into which a storage medium drive may be received.

22. The apparatus of claim 1 wherein the means for receiving comprises a plurality of channels are defined in the surface of each frame for receiving a plurality of storage medium drives.

23. The apparatus of claim 20 further including a mid-panel securable within the housing, the mid-panel having a surface defining at least one channel into which a storage medium drive may be received.

* * * * *